3,235,628
2-THIAPHOSPHONO COMPOUNDS
George M. Calhoun, Cleveland, Ohio, assignor to Shell Oil Company, a corporation of Delaware
No Drawing. Original application Dec. 14, 1959, Ser. No. 859,128. Divided and this application July 8, 1964, Ser. No. 381,233
7 Claims. (Cl. 260—948)

This patent application is a division of copending patent application Serial No. 859,128, filed December 14, 1959, and which matured as U.S. Patent 3,161,596 on December 15, 1964.

This invention relates to a new and novel class of oil-soluble phosphono compounds and particularly to oil-soluble omega-polar substituted 2-thiaalkylphosphono-containing compounds.

The new and novel compounds of the present invention are particularly useful in improving liquid hydrocarbons with respect to stability, wear inhibition and extreme pressure properties. These novel compounds have the general formula:

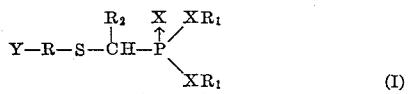

(I)

wherein R is an oil-soluble hydrocarbyl group, such as an alkyl, aryl, aralkyl, alkaryl or cycloalkyl radical having at least 2 and preferably being an alkyl radical having from 6 to 18 carbon atoms, $R_2$ is a $C_{1-4}$ alkyl radical or hydrogen, the $R_1$'s are the same or different groups selected from hydrogen, hydrocarbyl, or cationic groups, such as metallic or non-metallic cationic groups, such as mono or polyvalent metal or amine, preferably an alkylamine, and the X's are independently chalcogen atoms having an atomic number of from 8 to 16, i.e., oxygen or sulfur, and Y is a polar radical such as —$XR_1$, —$CXXR_1$, $N(R)_2$, where the X's and $R_1$'s are the same as defined above, with preferred polar group being —OH or —COOH. Preferred compounds of the general Formula I have the following formula:

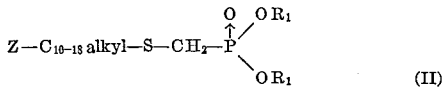

(II)

where Z is a hydroxyl, carboxyl or chloride group.

The 2-thiaalkyl phosphono compounds are prepared by reacting an omega-polar substituted mercaptan having at least 2 carbon atoms with a halomethylphosphono compound such as chloromethylphosphonic acid or its ester or salt derivative in a suitable solvent, such as an aqueous alcoholic solution, at reflux temperature and under inert conditions until the reaction is completed which normally may require up to about 5 days. The omega-substituted mercaptans include omega-substituted aliphatic mercaptans such as omega-hydroxy, omega-carboxy, omega-aminoethyl, butyl, hexyl, octyl, decyl, dodecyl, octadecyl, phenyldecyl, benzyl mercaptans and the like.

The following examples illustrate the preparation of the additives for use in accordance with the present invention.

Example I

Stoichiometric amounts of dibutyl chloromethyl phosphonate and beta-carboxy ethyl mercaptan ($HSCH_2CH_2COOH$)

were dispersed in an aqueous solution of ethyl alcohol and KOH and refluxed under a nitrogen atmosphere for about 24 hours. The final product was recovered by acidification and extraction with ether. It was dibutyl delta-carboxy-2-thiabutyl phosphonate

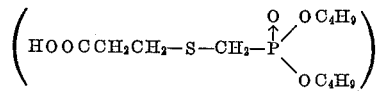

oil-soluble and possessed good extreme pressure and anti-oxidant properties.

Example II

Stoichiometric amounts of monobutyl chloromethyl phosphonate and beta-omega-hydroxy-substituted mercaptan ($HSCH_2CH_2OH$) were reacted under the conditions of Example I to yield monobutyl omega-hydroxy-2-thiamethyl phosphonate

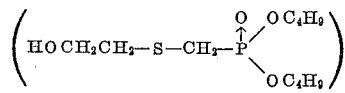

which possess good oil-solubility, extreme pressure and anti-oxidant properties.

Example III

Di-2-ethylhexylamine salt of omega-hydroxy-2-thiabutyl phosphonic acid

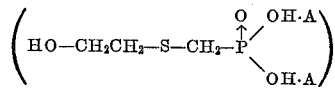

where A is the amine, was prepared by mixing stoichiometric amounts of di-2-ethylhexylamine with the acid at room temperature.

Example IV

Monobutyl omega-carboxy - decylmercaptomethylphosphonate was prepared according to the procedure of Example I by reacting stoichiometric amounts of monobutyl chloromethylphosphonate with potassium salt of omega-carboxydecyl mercaptan.

The following additional compounds were prepared: omega - hydroxyoctylmercaptomethylphosphonic acid, omega - hydroxydodecylmercaptomethylphosphonic acid, omega - aminohexylmercaptomethylphosphonic acid, dibutyl omega - carboxydecylmercaptomethylphosphonate, phenyl omega - carboxydecylmercaptomethyl acid phosphonate, dithiobutyl omega-carboxyhexylmercaptomethylphosphonate, tert-octadecyl - amine omega-hydroxydodecylmercaptomethylphosphonate and mixtures thereof.

The additives of this invention are novel compounds. They are oil-soluble and can be used in amounts of from about 0.1% to about 25%, preferably from about 0.5% to about 5.0% by weight in various liquid hydrocarbon products, such as natural and synthetic hydrocarbon lubricating oils, greases, fuels (gasoline, kerosene, gas oil, burner fuel oil), aphalts, waxes, slushing oils, industrial oils, e.g., metal working and drawing oils, quenching oils, textile oils, hydraulic oils, dielectric compositions and other industrial oils. They are particularly outstanding when added in small amounts to lubricating oils and lubricating compositions to impart extreme pressure and anti-wear properties to such materials. Also, these additives are useful additives for gasoline, fuel oils, and other light oil products.

The following compositions are illustrative of the invention, the percentages being by weight, of the indicated additive or additives with the remainder being essentially the base.

Composition A:
    Example I additive _____ 2%.
    1010 Mineral oil _____ Essentially balance.
Composition B:
    Example II additive _____ 2%.
    1010 Mineral oil _____ Essentially balance.
Composition C:
    Example IV additive _____ 2%.
    1010 Mineral oil _____ Essentially balance.
Composition D:
    Example II additive _____ 1%.
    SAE 90 Mineral oil _____ Essentially balance.
Composition E:
    Example I additive _____ 2%.
    SAE 90 Mineral oil _____ Essentially balance.
Composition F:
    Example I additive _____ 2%.
    Lauric acid _____ 2%.
    SAE 90 Mineral oil _____ Essentially balance.
Composition G:
    Example I additive _____ 5%.
    Ucon 50HB660 (polyethylene-propylene glycol having an SUS viscosity at 100° F. of 660) _____ Essentially balance.
Composition H:
    Example I additive _____ 2%.
    Di-2-ethylhexyl sebacate ____ Essentially balance.
Composition I:
    Example I additive _____ 1%.
    Leaded gasoline (3 cc. of TEL) _____ Essentially balance.
Composition J:
    Example I additive _____ 0.1%.
    Fuel Oil (No. 2) _____ Essentially balance.

Compositions of this invention were evaluated for their extreme pressure properties in the 4-Ball Wear machine described in Engineering, vol. 136, July 13, 1933.

TABLE I.—4-BALL WEAR TEST

[1800 r.p.m., 10 sec., steel on steel, ambient temp.]

| Composition: | Initial seizure load, kg. |
|---|---|
| Mineral Oil (1010) | 40–50 |
| Composition A | 158–178 |
| Composition B | 158–178 |

I claim as my invention:

1. Oil - soluble alkylthiamethylphosphono compound having the formula

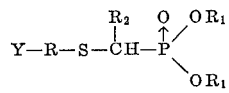

wherein R is a $C_2$—$C_{18}$ alkyl group, the $R_1$'s are selected independently from the group consisting of hydrogen and $C_{1-4}$ alkyl group and mixtures thereof, $R_2$ is selected from the group consisting of hydrogen and a $C_{1-4}$ alkyl groups, and Y is a polar group selected from the group consisting of —OH and —COOH groups.

2. Omega - hydroxy $C_{2-18}$ alkylthiamethylphosphonic acid.

3. Ester of omega-carboxy $C_{2-18}$ alkylthiamethylphosphonic acid and an alkanol of from 1 to 4 carbon atoms the acidic groups attached directly to the phosphorus atom being esterified.

4. Omega - carboxy $C_{10-18}$ alkylthiamethylphosphonic acid.

5. Ester of an omega-hydroxy-2-thiabutylphosphonic acid and an alkanol of from 1 to 4 carbon atoms.

6. Ester of an omega-carboxy-2-thiabutyl phosphonic acid and an alkanol of from 1 to 4 carbons the acidic groups attached directly to the phosphorus atom being esterified.

7. Dibutyl omega-hydroxy-2-thiabutylphosphonate.

References Cited by the Examiner

UNITED STATES PATENTS

| | | | |
|---|---|---|---|
| 2,356,754 | 8/1944 | Farrington et al. | 260—461 XR |
| 2,363,512 | 11/1944 | Farrington et al. | 260—461 XR |
| 2,963,505 | 12/1960 | Muhlman et al. | 260—461 |
| 3,112,271 | 11/1963 | Calhoun | 260—461 XR |

OTHER REFERENCES

Abuzov et al., "Zhur. Obshchei Khim.," volume 27, pages 2360-2362 (1957).

CHARLES B. PARKER, *Primary Examiner.*